United States Patent
Haldeman et al.

(10) Patent No.: US 10,387,890 B2
(45) Date of Patent: *Aug. 20, 2019

(54) METHOD AND APPARATUS FOR MANAGING FINANCIAL CONTROL VALIDATION PROCESSES

(71) Applicant: Lyft, Inc., San Francisco, CA (US)

(72) Inventors: Lance Haldeman, Somerset, NJ (US); Margie Ann Kolatac, Neshanic Station, NJ (US); Lisette Mendez, Plano, TX (US)

(73) Assignee: Lyft, Inc., San Francisco, CA (US)

( * ) Notice: Subject to any disclaimer, the term of this patent is extended or adjusted under 35 U.S.C. 154(b) by 259 days.

This patent is subject to a terminal disclaimer.

(21) Appl. No.: 14/518,775

(22) Filed: Oct. 20, 2014

(65) Prior Publication Data

US 2015/0039484 A1   Feb. 5, 2015

Related U.S. Application Data

(63) Continuation of application No. 11/083,631, filed on Mar. 18, 2005, now Pat. No. 8,868,456.

(60) Provisional application No. 60/614,076, filed on Sep. 29, 2004.

(51) Int. Cl.
*G06Q 30/00* (2012.01)
*G06Q 40/00* (2012.01)

(52) U.S. Cl.
CPC ........... *G06Q 30/018* (2013.01); *G06Q 40/00* (2013.01)

(58) Field of Classification Search
CPC .................................................. G06Q 40/00
USPC ........................................................ 705/35
See application file for complete search history.

(56) References Cited

U.S. PATENT DOCUMENTS

| | | | |
|---|---|---|---|
| 7,720,751 B2 * | 5/2010 | Bongiorno | G06Q 10/10 705/35 |
| 2002/0059093 A1 | 5/2002 | Barton et al. | |
| 2003/0018506 A1 * | 1/2003 | McLean | G06Q 10/0637 705/7.37 |
| 2004/0054630 A1 * | 3/2004 | Ginter | G06F 21/10 705/53 |
| 2004/0117283 A1 | 6/2004 | Germack | |
| 2004/0225586 A1 * | 11/2004 | Woods | G06Q 40/00 705/35 |

(Continued)

OTHER PUBLICATIONS

Standard on ratio studies Anonymous. Assessment Journal 6.5: 23-64. International Association of Assessing Officers. (Sep./Oct. 1999) (Year: 1999).*

*Primary Examiner* — Bruce I Ebersman
*Assistant Examiner* — John A Anderson
(74) *Attorney, Agent, or Firm* — FisherBroyles LLP

(57) ABSTRACT

The invention comprises a method and apparatus for determining compliance of at least one financial control. Specifically, the method comprises obtaining the at least one financial control where the at least one financial control is associated with at least one revenue generation process, selecting at least a portion of sample data associated with the at least one financial control, generating at least one test result by testing the at least one financial control using the at least a portion of the sample data, and determining at least one maturity level associated with the at least one financial control according to the at least one test result, the at least one maturity level for determining compliance of the at least one financial control with at least one regulation.

18 Claims, 4 Drawing Sheets

(56) References Cited

U.S. PATENT DOCUMENTS

| | | | |
|---|---|---|---|
| 2005/0065839 A1* | 3/2005 | Benson | G06Q 40/00 |
| | | | 705/35 |
| 2006/0004595 A1 | 1/2006 | Rowland et al. | |
| 2006/0080281 A1* | 4/2006 | Bongiorno | G06Q 10/10 |
| 2006/0129441 A1* | 6/2006 | Yankovich | G06Q 10/063114 |
| | | | 705/7.15 |
| 2008/0082376 A1* | 4/2008 | Kennis | G06F 17/30569 |
| | | | 705/7.15 |
| 2016/0005127 A1* | 1/2016 | Varma | G06Q 40/00 |
| | | | 705/36 R |

* cited by examiner

100

METHOD AND APPARATUS FOR MANAGING FINANCIAL CONTROL VALIDATION PROCESSES

This application is a continuation of U.S. patent application Ser. No. 11/083,631, filed Mar. 18, 2005, now U.S. Pat. No. 8,868,456, which claims the benefit of U.S. Provisional Application No. 60/614,076 filed on Sep. 29, 2004, all of which are herein incorporated by reference in their entirety.

FIELD OF THE INVENTION

The invention relates to the field of financial controls and, more specifically, to use of software processes for managing financial control validation processes.

BACKGROUND OF THE INVENTION

With the recent enactment of legislation such as the Sarbanes-Oxley Act (2002), public corporations are under increasing pressure to implement financial controls for ensuring compliance of corporate revenue generation processes with various governmental regulations and requirements. In general, the implementation of such financial controls, as well as validation processes for ensuring the effectiveness of the financial controls, requires management of enormous quantities of data associated with various aspects of the revenue generation process. Unfortunately, existing methods of validating financial controls are manually intensive. Furthermore, the existing methods of validating financial controls lack the capability to effectively test financial controls, and to measure the effectiveness of the financial controls, in order to prove compliance with applicable governmental regulations.

Accordingly, a need exists in the art for a method and apparatus for validating financial controls in order to prove compliance with governmental regulations respecting corporate revenue generation processes.

SUMMARY OF THE INVENTION

In one embodiment, the invention comprises a method and apparatus for determining compliance of at least one financial control. Specifically, the method comprises obtaining the at least one financial control where the at least one financial control is associated with at least one revenue generation process, selecting at least a portion of sample data associated with the at least one financial control, generating at least one test result by testing the at least one financial control using the at least a portion of the sample data, and determining at least one maturity level associated with the at least one financial control according to the at least one test result, the at least one maturity level for determining compliance of the at least one financial control with at least one regulation.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention is discussed in the context of a software architecture for managing financial control validation processes; however, the methodologies of the present invention can readily be applied to software architectures for controlling various other validation processes. In general, the present invention enables a public corporation to manage a financial control validation process, where the financial control validation process is used for ensuring compliance of at least one financial control with at least one regulation. As such, the present invention obviates the need for a user to manually define, generate, maintain, test, modify, and validate financial controls.

A revenue generation process generally comprises a corporate process for generation of revenue. As such, a revenue generation process comprises revenue generation activities, such as sales management, credit check processing, contract generation, service ordering, service provisioning, service billing, billing collections validation (e.g., comparing billing collections to associated billing system information), and like revenue generation activities. In order to ensure compliance of each revenue generation process activity with various regulations, financial controls associated with the revenue generation process activities are defined, generated, tested, modified, validated, and, ultimately, certified according to the methodologies of the present invention.

In general, a financial control comprises a measurable process for ensuring compliance of at least a portion of a revenue generation process (i.e., a revenue generation activity) with various governmental regulations and requirements. As such, the elements, as well as the associated parameters, that define a particular financial control vary according to the portion of the revenue generation process that the financial control is designed to evaluate. Furthermore, validation of a financial control (e.g., the process and information required for determining compliance of the financial control with at least one regulation) varies according to the portion of the revenue generation process that the financial control is designed to evaluate.

Figure 1:
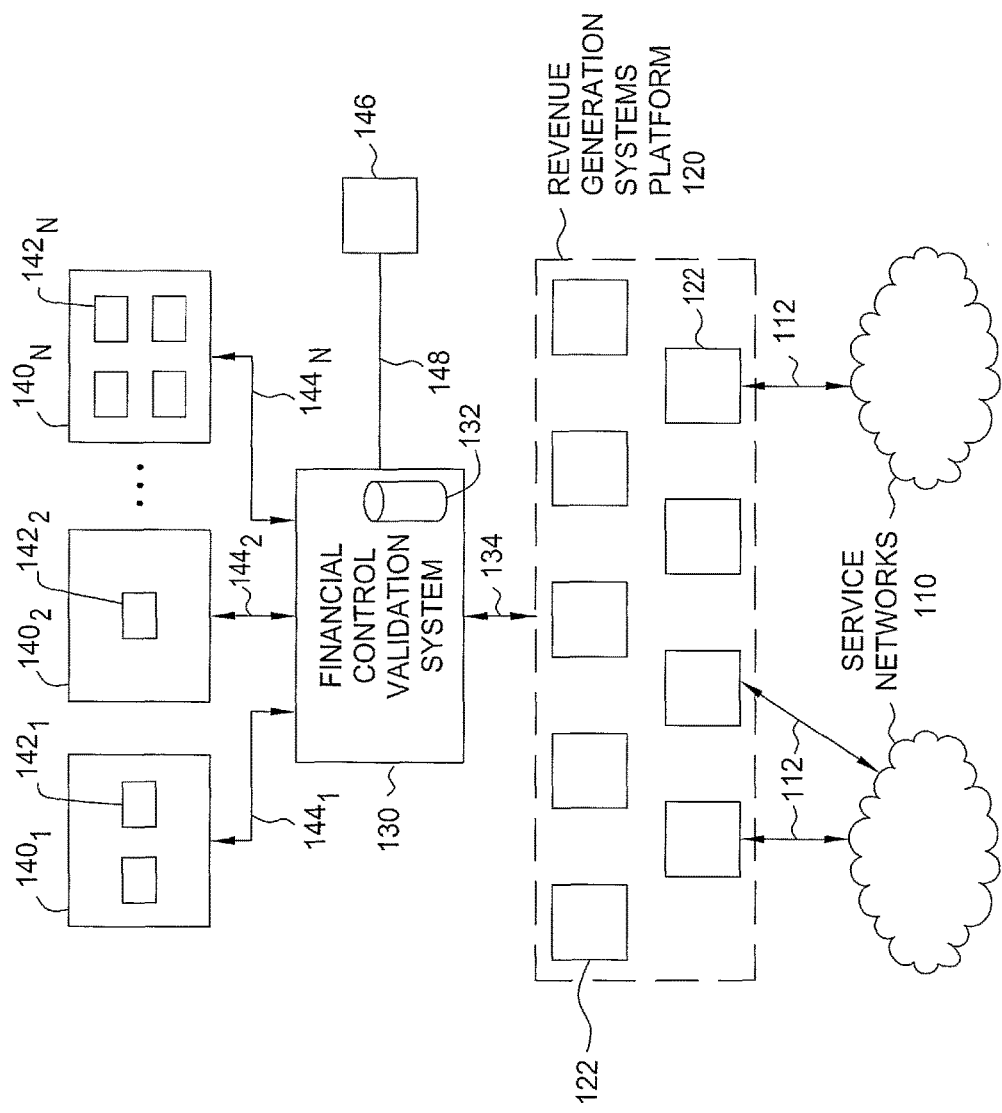
FIG. 1 depicts a high level block diagram of a revenue generation process network architecture comprising a financial control validation system.

FIG. 1 depicts a high-level block diagram of a revenue generation process network architecture comprising a financial control validation system. The revenue generation process network architecture 100 comprises a plurality of service networks (SNs) 110 (collectively, SNs 110), a revenue generation systems platform (RGSP) 120 comprising a plurality of revenue generation systems (RGSs) 122 (collectively, RGSs 122), a financial control validation system (FCVS) 130, and a plurality of workcenters (WCs) 140$_1$-140$_N$ (collectively, WCs 140).

The RGSs 122 comprise systems associated with corporate revenue generation processes. As such, RGSs 122 may comprise sales systems, credit check processing systems, contract management systems, service ordering systems, service provisioning systems, service billing systems, billing collections systems, billing collections validation systems, and like systems associated with a corporate revenue generation process. In one embodiment, as depicted in FIG. 1, at least a portion of the RGSs 122 communicate with the SNs 110, via an associated plurality of communication links (CLs) 112 (collectively, CLs 112), for obtaining financial control sample data for testing financial controls.

In one embodiment, as depicted in FIG. 1, FCVS 130 communicates with at least a portion of the RGSs 122 via at least one communication link (CL) 134. In one such embodiment, FCVS 130 obtains at least a portion of the financial control information directly from RGSs 122. In another embodiment, as depicted in FIG. 1, FCVS 130 comprises a database (DB) 132. In one such embodiment, DB 132 stores at least a portion of the financial control information obtained from at least a portion of the RGSs 122. In another such embodiment, at least a portion of the financial control information from the RGSs 122 obtained as flat-files and stored in DB 132 for use performing the methodologies of the present invention.

As depicted in FIG. 1, FCVS 130 is accessible via respective pluralities of user terminals (UTs) $142_1$-$142_N$ (collectively, UTs 142) located within the associated WCs $140_1$-$140_N$. As depicted in FIG. 1, the pluralities of UTs $142_1$, $142_2$, and $142_N$ located within WCs $140_1$, $140_2$, and $140_N$, respectively, communicate with FCVS 130 via a respective plurality of communication links (CLs) $144_1$-$144_N$ (collectively, CLs 144). Furthermore, FCVS 130 is optionally accessible via a standalone user terminal (SUT) 146 via an associated communication link (CL) 148. In one embodiment, at least a portion of the methodologies of the present invention may be performed by FCVS 130.

As depicted in FIG. 1, the WCs 140 comprise corporate locations providing secure access to FCVS 130 via associated UTs 142. The UTs 142 and SUT 146 comprise computers operable for accessing FCVS 130. As such, the UTs 142 and SUT 146 comprise means for adapting information obtained from FCVS 130, and associated user interfaces for displaying the adapted information obtained from FCVS 130. For example, SUT 146 may comprise Internet browser software for displaying information obtained from FCVS 130, and associated user entry means for manipulating, modifying, supplementing, testing, and certifying the displayed information, and for performing other like functions.

Although depicted as comprising specific numbers of SNs 110, CLs 112, RGSPs 120, RGSs 122, FCVSs 130, DBs 132, CLs 134, WCs 140, UTs 142, CLs 144, SUTs 146, and CLs 148, those skilled in the art will appreciate that fewer or more SNs 110, CLs 112, RGSPs 120, RGSs 122, FCVSs 130, DBs 132, CLs 134, WCs 140, UTs 142, CLs 144, SUTs 146, and CLs 148 may be used. Similarly, the SNs 110, CLs 112, RGSPs 120, RGSs 122, FCVSs 130, DBs 132, CLs 134, WCs 140, UTs 142, CLs 144, SUTs 146, and CLs 148 may be deployed in various other configurations. Furthermore, various other networks, network elements, systems, workcenters, user terminals, and communication links may be deployed for supporting of the methodologies of the present invention.

Figure 2:
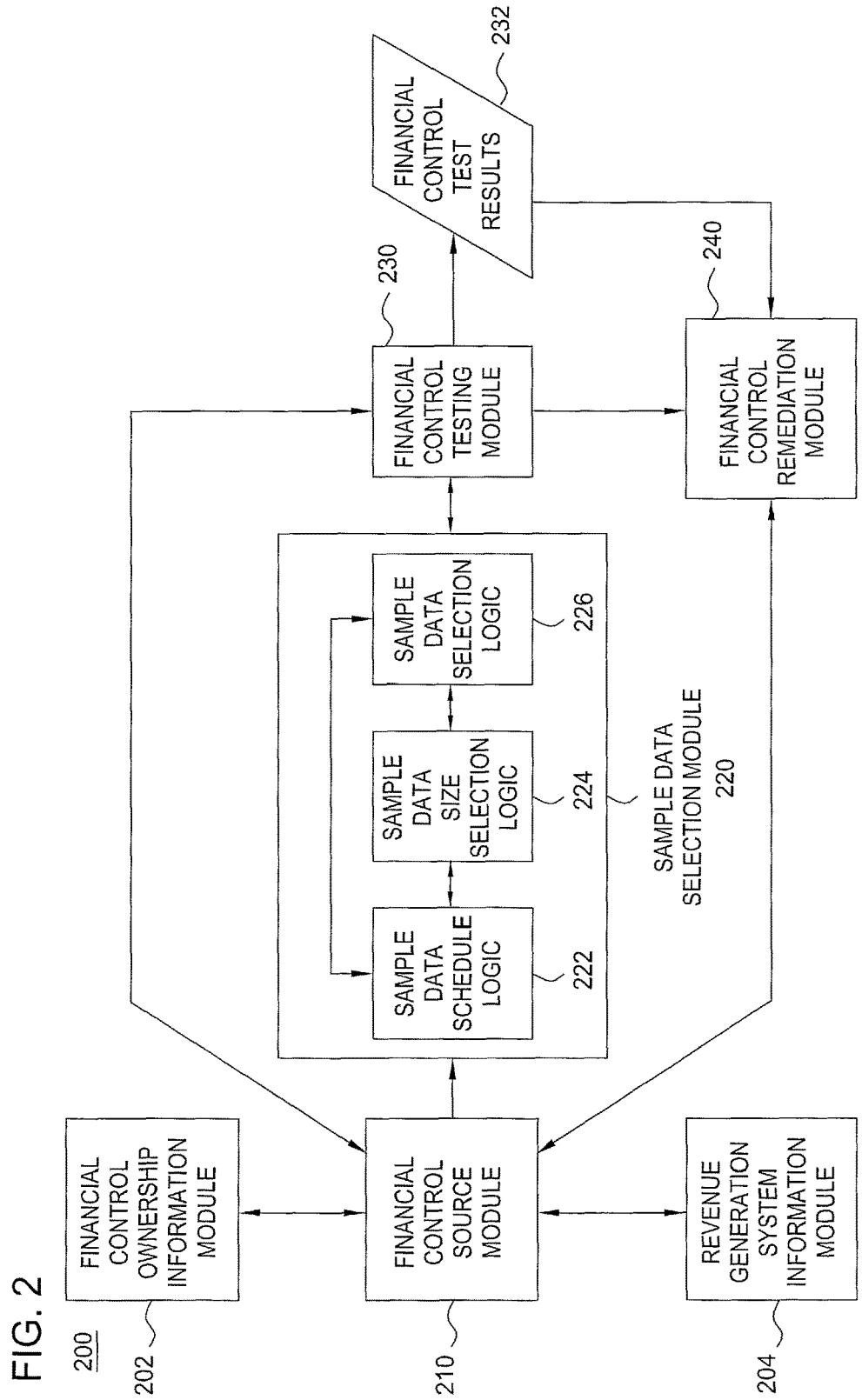
FIG. 2 depicts a high level block diagram of a financial control validation module software architecture.

FIG. 2 depicts a high level block diagram of a financial control validation module software architecture. In one embodiment, the financial control validation module software architecture of FIG. 2 is implemented as at least a portion of FCVS 130 depicted and described herein with respect to FIG. 1. Specifically, financial control validation module software architecture 200 of FIG. 2 comprises a financial control ownership information module (FCOIM) 202, a revenue generation system information module (RGSIM) 204, a financial control source module (FCSM) 210, a sample data selection module (SDSM) 220, a financial control testing module (FCTM) 230 for generating financial control test results (FCTRs) 232, and a financial control remediation module (FCRM) 240.

The FCSM 210 comprises a module for generating financial controls, storing financial controls, modifying financial controls, managing financial controls, certifying financial controls, and performing like functions. In one embodiment, FCSM 210 maintains at least one financial control record and associated financial control information (e.g., financial control elements of which a financial control is comprised, financial control parameters associated with the financial control elements, and the like) for each financial control. In one embodiment, each financial control may be assigned a weighting factor indicative of the potential impact of that financial control to overall corporate financials (e.g., impact to the overall revenue generation process).

In one embodiment, a financial control comprises an associated financial control maturity level associated with the financial control. In general, a financial control maturity level comprises a measure of the compliance of the financial control with at least one regulation (e.g., government requirement) associated with that financial control. For example, a financial control maturity level may comprise a scale-based rating (e.g., a maturity level rating in a range from 1-5). Similarly, a financial control maturity level may comprise a score-based rating (e.g., a maturity level rating in a range from 1-100). In one embodiment, at least one scale-based financial control maturity level may be used to compute a score-based financial control maturity level.

In another embodiment, a financial control comprises an associated financial control risk level indicative of the risk inherent to the financial control. Similar to the financial control maturity level, a financial control risk level may be measured according to a scale-based rating, a score-based rating, and like measures for quantifying risk. In one embodiment, the financial control risk level is determined according to at least one of a plurality of factors (e.g., whether the financial control is implemented manually versus automatically, the frequency with which the financial control is tested, the amount of sample data required for testing the financial control, and like factors).

For example, a financial control may comprise a bill printing process. In this example, financial control elements may comprise various rules defining a method for calculating, organizing, and printing customer bills. Furthermore, in this example, each of the rules for calculating, organizing, and printing bills may comprise associated financial control parameters, such as a billing period parameter (e.g., print the bills monthly), a bill printing start time (e.g., print the bills five days after close of the current billing period), and like financial control parameters. In one embodiment, management of a financial control by FCSM 210 is performed using financial control ownership information obtained from FCOIM 202 and revenue generation system information obtained from RGSIM 204.

In general, financial control ownership information identifies responsibility for financial controls based on location (e.g., workcenter location), job title (e.g., a chief financial officer (CFO) is responsible for financial controls associated with filings to the Securities and Exchange Commission (SEC)), and like parameters. As such, FCOIM 202 comprises ownership parameters associated with each financial control, such as workcenter location, financial control executive (e.g., a CFO), financial control organization, financial control manager, financial control owner, financial control ownership date, and like ownership parameters. As such, attempts by users to access financial controls and associated financial control information may be authenticated using the relationship between the financial controls maintained by FCSM 210 and the financial control ownership information maintained by FCOIM 202.

In general, revenue generation system information comprises information available from revenue generation systems. Since the RGSs 122 comprise various systems associated with the corporate revenue generation process (e.g., contract management systems, billing systems, billing collection management systems, and the like), RGSIM 204 is operable for obtaining financial control definition information (e.g., regulations, requirements, rules, and the like), as well financial control sample data (e.g., sample data for use in testing financial controls to determine compliance with the regulations, requirements, rules, and the like).

For example, RGSIM 204 comprises information such as service contract terms, service billing requirements, sales credits, billing collections data, billing dispute records, and like financial control information and associated sample data. In other words, in one embodiment, RGSIM 204 interfaces with various operations support systems (illustratively, RGSs 122) used for implementing the financial controls across the corporation in order to test the maturity (i.e., effectiveness) of those financial controls. In one embodiment, RGSIM 204 comprises information useful for generation of new financial controls, as well as modification of existing financial controls.

As depicted in FIG. 2, FCSM 210 communicates with FCTM 230, enabling FCTM 230 to obtain financial controls from FCSM 210. In one embodiment, FCTM 230 may request a financial control from FCSM 210 in response to initiation of a test for validating the financial control. In another embodiment, FCSM 210 may transmit a financial control to FCTM 230 in response to initiation of a test for validating the financial control. In one embodiment, upon initiation of a financial control test, FCSM 210 may transmit at least a portion of the financial control information associated with the selected financial control to the SDSM 220. The financial control information provided to SDSM 220 may be used for performing financial control sample data selection processing.

The SDSM 220 comprises sample data schedule logic (SDSL) 222, sample data size selection logic (SDSSL) 224, and sample data selection logic (SDSL) 226. The SDSM 220 processes received financial control information for selecting sample data for use in testing the selected financial control. As depicted in FIG. 2, SDSL 222, SDSSL 224, and SDSL 226 communicate for determining selection of sample data for testing financial controls. As described herein, SDSL 222 determines the schedule associated with selection of sample data for testing financial controls, SDSSL 224 determines the sample data size associated with selection of sample data for testing financial controls, and SDSL 226 determines the sample data selected for testing financial controls.

The SDSL 222 determines a schedule (e.g., at least one sample data schedule requirement) for testing financial controls. In one embodiment, the frequency of testing associated with the financial controls (e.g., daily, weekly, monthly, quarterly, yearly, and the like) varies across financial controls. In one such embodiment, initiation of a test for validating a financial control may be triggered automatically by SDSL 222 based on current date/time. In another such embodiment, SDSL 222 may trigger FCTM 230 to initiate a test for validating a financial control. In another embodiment, SDSL 222 may use the schedule for determining the period from which sample data may be selected (e.g., only sample data from January 2005 is available for selection by SDSL 226). In one further embodiment, the sample data schedule required for accurately testing a financial control is modified by FCRM 240 based on the FCTRs 232 associated with a previous test of the financial control.

The SDSSL 224 determines an amount of sample data (e.g., at least one sample data size requirement) required for testing a financial control. In one embodiment, the amount of sample data required for testing a financial control is determined according to at least one governmental requirement. In another embodiment, the amount of sample data required for testing a financial control is determined according to one or more sample data size rules associated with the financial control. In one further embodiment, the amount of sample data required for accurately testing a financial control is modified by FORM 240 based on the FCTRs 232 associated with a previous test of the financial control.

For example, for a financial control comprising daily records that is tested according to a monthly schedule, twenty data samples may be available for selection during financial control testing. In this example, of the twenty available data samples, governmental regulations may require that a test of the financial control include at least ten of the twenty available data samples. Similarly, in this example, of the twenty available data samples, successive iterations of financial control tests may result in a determination that one hundred percent compliance of the financial control requires use of at least twelve of the twenty available data samples.

The SDSL 226 determines which sample data to select for use in testing a financial control. In one embodiment, sample data for testing a financial control is selected according to at least one regulation (e.g., a requirement defined by the SEC) requirement. In another embodiment, sample data for testing a financial control is selected according to one or more sample data selection rules associated with the financial control. In one further embodiment, the rules for selection of sample data required for accurately testing a financial control is modified by FORM 240 based on the FCTRs 232 associated with a previous test of the financial control.

For example, for a financial control comprising daily records that is tested according to a monthly schedule, governmental regulations may require that a test of the financial control include at least ten of the twenty data samples available for selection during financial control testing. In this example, of the ten selected data samples, governmental regulations may require that a test of the financial control include at least two data samples from each week of the month. Similarly, of the ten selected data samples, successive iterations of financial control tests may result in a determination that one hundred percent compliance of the financial control requires use of a data sample from each Friday of the month.

As depicted in FIG. 2, FCTM 230 tests financial controls. In general, FCTM 230 performs testing on financial controls associated with various revenue generation processes. In one embodiment, FCTM 230 tests a financial control in order to determine a maturity level associated with the financial control. In order to execute financial control testing, FCTM 230 obtains, from FCSM 210, financial controls and associated financial control information, and obtains, from SDSM 220, data samples required for testing those financial controls. The FCTM 230 processes the financial control information and associated data samples to generate associated FCTRs 232.

In one embodiment, FCTM 230 comprises a financial control testing schedule for planning the testing of various financial controls associated with a revenue generation process. In one embodiment, FCTM 230 comprises the financial control testing requirements that define the processing required for testing a financial control. In this embodiment, FCTM 230 may access financial control testing requirements using a financial control identifier associated with the financial control obtained from the FCSM 210. In another embodiment, the financial control information obtained from FCSM 210 comprises at least a portion of the financial control testing requirements that define the processing required for testing a financial control.

In one embodiment, a single financial control may be tested using a plurality of associated financial control tests. In another embodiment, a plurality of financial controls may be tested using a single financial control test. In other words, in one embodiment, each financial control may be tested individually. In another embodiment, a plurality of financial controls may be tested contemporaneously. As such, at least a portion of a revenue generation process may be validated by testing at least one financial control designed for ensuring compliance of the revenue generation process with governmental regulations and requirements.

In one embodiment, the FCTRs 232 comprise various financial control test results indicative of compliance with governmental regulations (i.e., adherence by those responsible for the financial control to the documented financial control process). For example, for a financial control for bill printing, the FCTRs 232 may comprise an indication that although bills are printing, a portion of the bills scheduled to be printed were not printed because the associated billing files were not received from the RGSs 122. Similarly, for a financial control for bill printing, the FCTRs 232 may comprise an indication that a portion of the printed bills were printed incorrectly because only a portion of the required billing files were received from the RGSs 122.

In one embodiment, the FCTRs 232 comprise a financial control maturity level associated with the financial control tested by FCTM 230. In one embodiment, the financial control maturity level associated with a financial control prior to the financial control test is adapted according to the FCTRs 232 to produce an updated financial control maturity level associated with the financial control. In another embodiment, a new financial control maturity level is determined according to the FCTRs 232 (irrespective of the previous financial control maturity level associated with the financial control). In this embodiment, the new financial control maturity level may be compared to the original financial control maturity level for determining improvement/deterioration in the maturity level associated with that financial control.

As depicted in FIG. 2, FORM 240 performs remediation processing on the FCTRs 232 for identifying potential modifications to the financial controls associated with the FCTRs 232. In one embodiment, FORM 240 obtains financial controls and associated financial control information from FCSM 210. In another embodiment, FCRM 240 obtains financial control testing information from FCTM 230. The FORM 240 processes the financial control information and, optionally, the financial control testing information, in order to identify potential financial control modifications.

In one embodiment, the resulting financial control maturity level determined for a financial control tested by FCTM 230 is passed to FORM 240. In one such embodiment, FORM 240 determines whether financial control remediation processing is performed to modify the existing financial control. In another embodiment, FCTM 230 may determine whether to pass a financial control to FORM 240 for modifying that financial control. In one embodiment, the decision whether to initiate financial control remediation processing for a particular financial control may be performed using at least one threshold. For example, a financial control for which the associated financial control maturity level is below 4.5 (as determined from the FCTRs 232) may be automatically selected for financial control remediation processing.

In one embodiment, modification of a financial control according to remediation processing comprises at least one of: modifying at least one financial control parameter associated with the financial control (e.g., parameters used for creating a measurable representation of one or more governmental requirements), modifying the financial control data sampling schedule, modifying the financial control sample data size requirements, modifying the financial control sample data selection rules, modifying a test procedure associated with testing the financial control, and like adaptations of existing financial control requirements, financial control information, and financial control procedures.

In one embodiment, results of remediation processing are passed from FORM 240 to FCSM 210. In one such embodiment, at least a portion of the remediation results are processed by FCSM 210 for effecting the financial control modifications defined by the remediation results. In another such embodiment, at least a portion of the remediation results are displayed to a user via a user interface, enabling the user to manually modify a financial control according to the remediation results. For example, a user may manually increase a financial control data sampling size requirement in response to an indication (via the remediation results) that an improved financial control maturity level may be attained by sampling a larger portion of the available financial control data.

In one embodiment, an average financial control maturity level may be determined according to respective maturity levels associated with a plurality of financial controls. Similarly, in another embodiment, an average financial control risk level may be determined according to respective risk levels associated with a plurality of financial controls. In one further embodiment, calculation of an average financial control maturity level and calculation of an average financial control risk level may be performed using the associated financial control weighting factors described herein.

In one embodiment, at least one average financial control maturity level may be used for at least one of: certification of at least one financial control, certification of at least one financial accounting requirement, certification of at least a portion of a revenue generation process, and like higher levels of certification. Similarly, at least one average financial control maturity level may be used for certification across owners, locations, and the like. For example, an average financial control maturity level may be determined for a group of financial controls managed by a particular workcenter location (e.g., managed by WC $140_2$ depicted in FIG. 1), for a group of financial controls owned by a particular financial control manager (e.g., owned by the CFO of the corporation), and the like.

Figure 3:
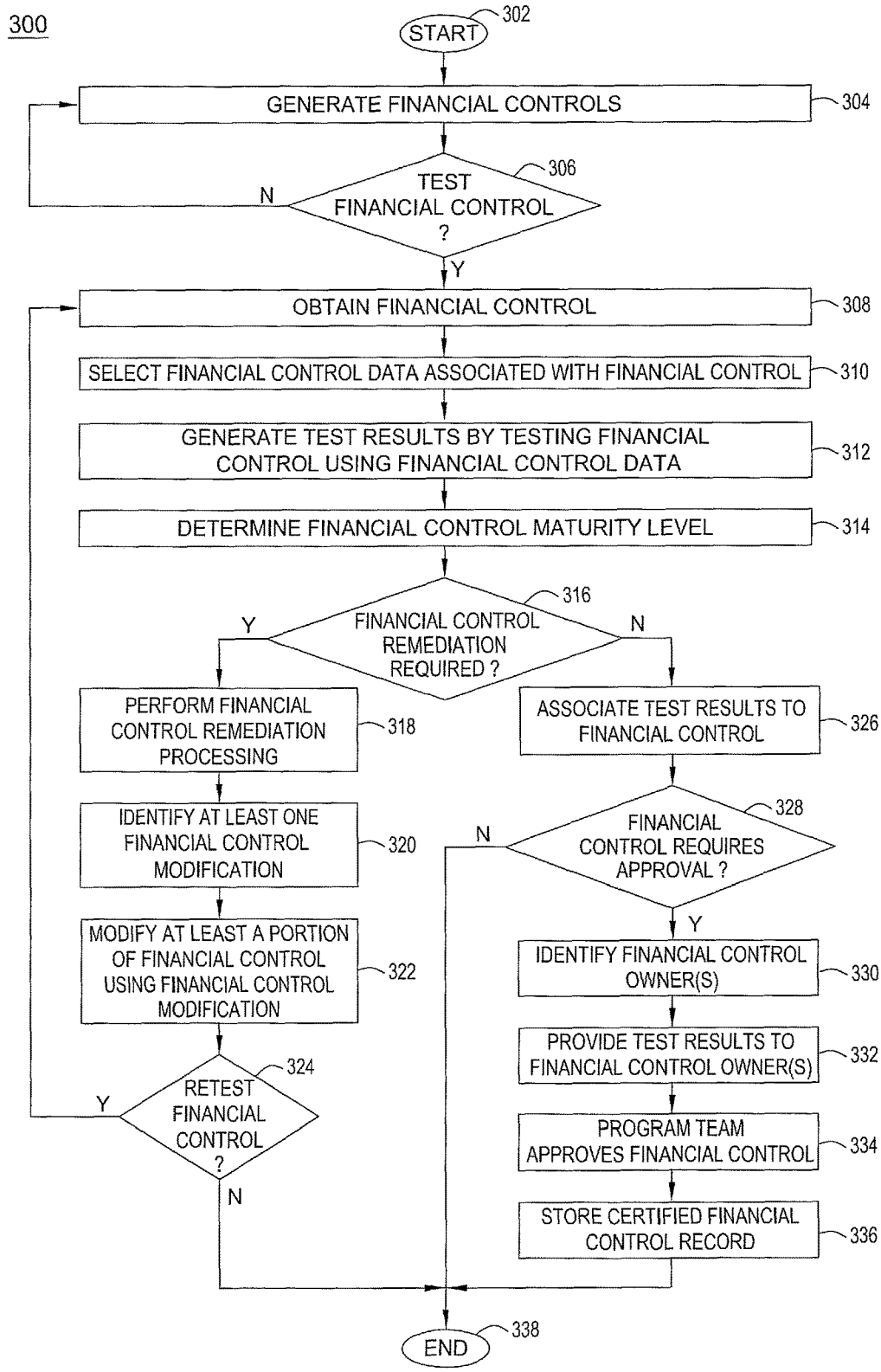
FIG. 3 depicts a flow diagram of a method according to one embodiment of the invention.

FIG. 3 depicts a flow diagram of a method according to one embodiment of the invention. Specifically, method 300 of FIG. 3 comprises a method for certifying at least one financial control associated with at least one revenue generation process. Although depicted as being performed serially, those skilled in the art will appreciate that at least a portion of the steps of method 300 may be performed contemporaneously, as well as in a different order than presented in FIG. 3. The method 300 is entered at step 302 and proceeds to step 304.

At step 304, at least one financial control is generated. In one embodiment, a financial control is generated by FCSM 210. In another embodiment, a financial control is generated by FORM 240 and stored by FCSM 210. In another embodiment, a financial control is generated by at least one remote system and stored by FCSM 210. In one embodiment, a financial control is generated according to at least one governmental regulation and at least one parameter associated with at least one revenue generation process. At step 306, a determination is made as to whether to test a financial control. If a financial control is not tested, method 300 returns to step 304. If a financial control is tested, method 300 proceeds to step 308.

At step 308, a financial control is obtained. Although described with respect to FIG. 3 as testing one financial control, a plurality of financial controls may be tested. In this embodiment, in which a plurality of financial controls is tested, a plurality of financial controls is obtained. In one embodiment, a financial control is obtained from FCSM 210. In one embodiment, the financial control is obtained by FCTM 230. In one embodiment, financial control information (e.g., a financial control elements and associated parameters, a financial control maturity level, a financial control risk level, and like financial control information) associated with the financial control is obtained.

At step 310, financial control sample data required for testing the financial control is selected. In one embodiment, selection of the financial control sample data is performed by DSSL 220. In one embodiment, selection of financial control sample data comprises determining at least one sample data schedule requirement associated with a financial control, determining at least one sample data size requirement associated with a financial control, and selecting at least a portion of the financial control sample data according to both the at least one sample data schedule requirement and the at least one sample data size requirement.

At step 312, test results associated with the financial control are generated by testing the financial control using the financial control sample data. At step 314, a financial control maturity level is determined. In one embodiment, the financial control maturity level is determined using at least a portion of the financial control test results. At step 316, a determination is made as to whether financial control remediation processing is required. If financial control remediation processing is not required, method 300 proceeds to step 326. If financial control remediation processing is required, method 300 proceeds to step 318.

At step 318, financial control remediation processing is performed. In one embodiment, financial control remediation processing is performed by FCRM 240. At step 320, at least one financial control modification is identified. In one embodiment, a financial control modification comprises a change to at least a portion of a financial control. For example, a financial control modification may comprise a change to at least one of: a financial control element (by which the control is defined), a financial control rule, a financial control data sampling schedule, a financial control sample data selection algorithm, and like financial control features.

At step 322, at least a portion of the financial control is modified using the financial control modifications. In one embodiment, the financial control is modified by FCRM 240, and the modified financial control is passed to FCSM 210, where the modified financial control is stored. In another embodiment, the financial control is modified by FCSM 210 using financial control modifications obtained from FORM 240. In one embodiment, modification of a financial control is performed in a manner tending to improve the financial control. For example, modification of a financial control may be performed to increase the financial control maturity level, decrease the financial control risk level, and the like.

At step 324, a determination is made as to whether to retest the financial control. In one embodiment, the decision as to whether to retest the financial control is performed automatically according to the financial control maturity level. In another embodiment, the decision as to whether to retest the financial control is performed manually by a user via an associated user interface. If the financial control is retested, method 300 returns to step 308, at which point the modified version of the previously tested financial control is obtained. If the financial control is not retested, method 300 proceeds to step 338, where method 300 ends.

At step 326, the test results are associated to the financial control. Since the financial control test results may comprise proof of the validity of the financial control, association of the financial control test results to the financial control ensures a direct relationship between the financial control and the associated evidence of the validity of that financial control. In one embodiment, the association of the test results to the financial control is adaptable for display via a user interface. In another embodiment, financial control results may be associated to financial controls across owners, locations, and the like. As such, users located in different workcenters may access various financial controls and associated financial control test results. This enables financial control owners to access the financial control, and to view the associated financial control test results for determining whether to certify the financial control.

At step 328, a determination is made as to whether a financial control requires approval. In one embodiment, the determination as to whether a financial control requires approval is performed automatically (e.g., according to financial control maturity level, financial control risk level, and the like). In another embodiment, the decision as to whether a financial control requires approval is performed manually by a user via an associated user interface. If the financial control does not require approval, method 300 proceeds to step 338, where the method 300 ends. If the financial control requires approval, method 300 proceeds to step 330.

At step 330, at least one financial control owner associated with the financial control is identified. In one embodiment, the financial control owner(s) associated with the financial control is identified using an association between the financial control in FCSM 210 and financial control ownership information maintained in FCOIM 202. At step 332, the financial control test results are provided to the financial control owner(s) for approval. In one embodiment, the associated between financial controls and financial control owners is adaptable for display to a user interface (e.g., a user interface associated with one of the UTs 142).

At step 334, the financial control owner approves the financial control. In one embodiment, approval of a financial control comprises reviewing the at least one certification status associated with the financial control, where the at least one certification status is indicative of compliance of the financial control with at least one governmental regulation. In one embodiment, in which multiple owners are associated with a financial control, approval of a financial control may require approval of each owner associated with the financial control. In one such embodiment, a program team approves a financial control. In one embodiment, a financial control owner approves a financial control via a user interface (e.g., using point-and-click operations). Upon approval of the financial control by the financial control owner(s), method 300 proceeds to step 336.

At step 336, the approved financial control record (i.e., the financial control, financial control definition, financial control elements, financial control test results and associated sample data, financial control certification, financial control approval, and the like) is stored. In one embodiment, at least a portion of the stored financial control record is adaptable for transmission to remote UTs, display to user interfaces, and the like. In one embodiment, the financial control test results (and, optionally, the entire financial control record) undergo change control processing. In one further embodiment, change control processing comprises adapting at least a portion of the financial control record for display to (and approval by) at least one associated business partner. The method 300 then proceeds to step 338, where the method 300 ends.

Figure 4:
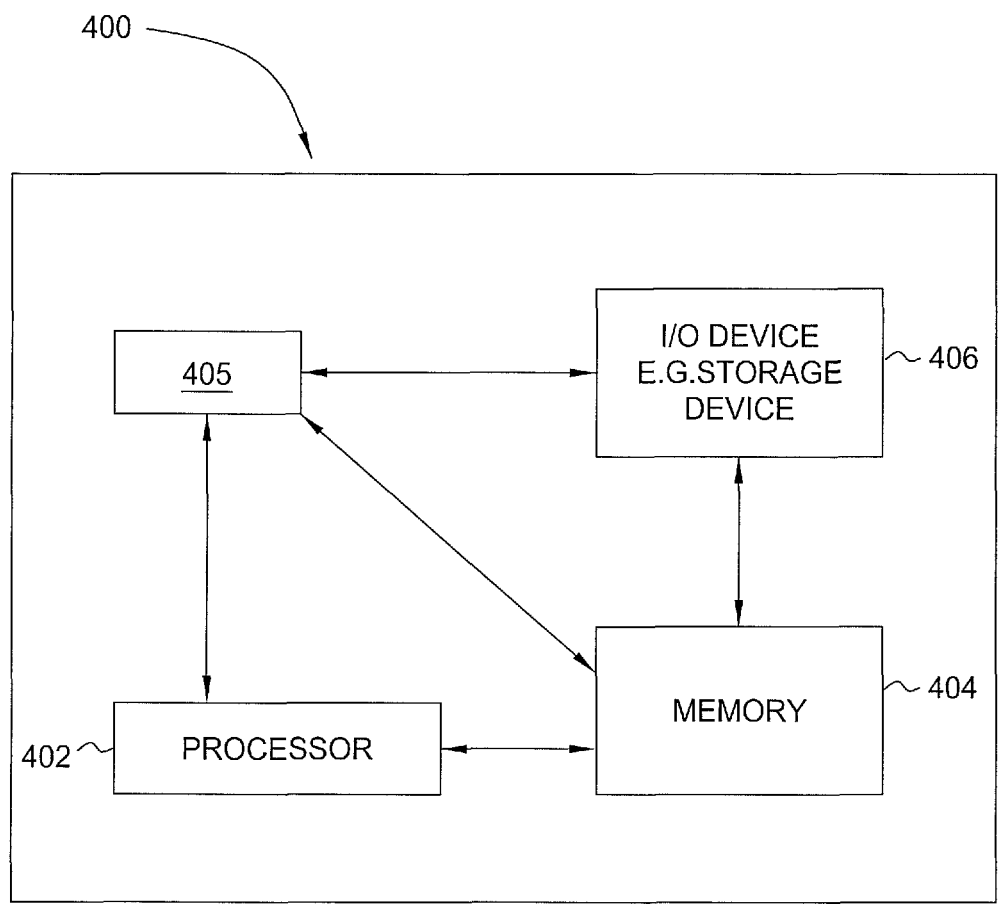
FIG. 4 depicts a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a financial control validation module 405, and various input/output devices 406 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present financial control validation module or process 405 can be loaded into memory 404 and executed by processor 402 to implement the functions as discussed above. As such, the present financial control validation process 405 (including associated data structures) of the present invention can be stored on a computer readable medium or carrier, e.g., RAM memory, magnetic or optical drive or diskette and the like.

It is contemplated that at least a portion of the described functions may be combined into fewer functional elements/devices. Similarly, it is contemplated that various functions may be performed by other functional elements, or that the various functions may be distributed across the various functional elements in a different manner. Furthermore, although primarily described herein with respect to revenue generation processes and associated financial audit processes, those skilled in the art will appreciate that the methodology and structure of the present invention may be used for managing various other audit processes such as software development compliance processing, environmental protection compliance processing, and the like.

Although various embodiments which incorporate the teachings of the present invention have been shown and described in detail herein, those skilled in the art can readily devise many other varied embodiments that still incorporate these teachings.

What is claimed is:

1. A method comprising:
  receiving a request to validate a control associated with a process and a plurality of data samples;
  in response to receiving the request:
    obtaining, by a processor via a communication link to a plurality of systems associated with the process, the control;
    selecting, by the processor, a subset of the plurality of data samples, the data samples included in the subset of the plurality of data samples identified in accordance with a requirement associated with the process;
    determining, in accordance with the requirement, a sample data schedule requirement associated with the control and a sample data size requirement associated with the control; and
    testing, by the processor, the control using the subset of the plurality of data samples, the testing comprising:
      interfacing with, via the communication link, the plurality of systems associated with the process;
      determining a maturity level associated with the control, the maturity level comprising a scale-based rating for indicating a degree of compliance of the control with the requirement; and
      generating, by the processor, a test result;
    determining, by the processor, that the maturity level is below a threshold based on the scale-based rating;
    modifying, by the processor, the control based on determining that the maturity level is below the threshold and based on identifying a modification for use in modifying the control;
    testing, by the processor, the modified control, the testing comprising:
      determining an updated maturity level associated with the modified control, the updated maturity level comprising an updated scale-based rating; and
      generating a new test result;
    determining, by the processor, that the updated maturity level is above the threshold based on the updated scale-based rating;
    validating, by the processor, the modified control in response to determining that the updated maturity level is above the threshold; and
    adapting, for display via a user interface, the control, a portion of the test result, a portion of the new test result, and the modification.

2. The method of claim 1, wherein the data samples included in the subset of the plurality of data samples are identified in accordance with the sample data schedule requirement and the sample data size requirement.

3. The method of claim 1, wherein modifying the control improves the maturity level associated with the control.

4. The method of claim 1, further comprising:
  generating the control according to the requirement and a parameter associated with the process.

5. The method of claim 1, further comprising:
  determining a certification status associated with the process, the certification status indicative of compliance of the process with the requirement.

6. The method of claim 1, wherein the process is a revenue generation process comprising at least one of a sales management activity, a credit check processing activity, a contract generation activity, a service ordering activity, a service provisioning activity, or a billing collections validation activity.

7. The method of claim 6,
  wherein the control is a financial control, and
  wherein the requirement is a government regulation.

8. A non-transitory computer readable medium storing a plurality of instructions which, when executed by a processor, cause the processor to perform operations, the operations comprising:

receiving a request to validate a control associated with a process and a plurality of data samples;

in response to receiving the request:

obtaining, via a communication link to a plurality of systems associated with the process, the control;

selecting a subset of the plurality of data samples, the data samples included in the subset of the plurality of data samples identified in accordance with a requirement associated with the process;

determining, in accordance with the requirement, a sample data schedule requirement associated with the control and a sample data size requirement associated with the control; and testing the control using the subset of the plurality of data samples, the testing comprising:

interfacing with, via the communication link, the plurality of systems associated with the process;

determining a maturity level associated with the control, the maturity level comprising a scale-based rating for indicating a degree of compliance of the control with the requirement; and generating a test result;

determining that the maturity level is below a threshold based on the scale-based rating;

modifying the control based on determining that the maturity level is below the threshold and based on identifying a modification for use in modifying the control;

testing the modified control, the testing comprising:

determining an updated maturity level associated with the modified control, the updated maturity level comprising an updated scale-based rating; and generating a new test result;

determining that the updated maturity level is above the threshold based on the updated scale-based rating;

validating the modified control in response to determining that the updated maturity level is above the threshold; and adapting, for display via a user interface, the control, a portion of the test result, a portion of the new test result, and the modification.

9. The non-transitory computer readable medium of claim 8, wherein the data samples included in the subset of the plurality of data samples are identified in accordance with the sample data schedule requirement and the sample data size requirement.

10. The non-transitory computer readable medium of claim 8, wherein modifying the control improves the maturity level associated with the control.

11. The non-transitory computer readable medium of claim 8, wherein the operations further comprise:

generating the control according to the requirement and a parameter associated with the process.

12. The non-transitory computer readable medium of claim 8, wherein the operations further comprise:

determining a certification status associated with the process, the certification status indicative of compliance of the process with the requirement.

13. The non-transitory computer readable medium of claim 8, wherein the process is a revenue generation process further comprising at least one of a sales management activity, a credit check processing activity, a contract generation activity, a service ordering activity, a service provisioning activity, or a billing collections validation activity.

14. The non-transitory computer readable medium of claim 13, wherein the control is a financial control, and wherein the requirement is a government regulation.

15. An apparatus comprising:

a processor; and a computer-readable medium storing a plurality of instructions which, when executed by the processor, cause the processor to perform operations, the operations comprising:

receiving a request to validate a control associated with a process and a plurality of data samples;

in response to receiving the request:

obtaining, via a communication link to a plurality of systems associated with the process, the control;

selecting a subset of the plurality of data samples, the data samples included in the subset of the plurality of data samples identified in accordance with a requirement associated with the process;

determining, in accordance with the requirement, a sample data schedule requirement associated with the control and a sample data size requirement associated with the control; and testing the control using the subset of the plurality of data samples, the testing comprising:

interfacing with, via the communication link, the plurality of systems associated with the process;

determining a maturity level associated with the control, the maturity level comprising a scale-based rating for indicating a degree of compliance of the control with the requirement; and generating, by the processor, a test result;

determining that the maturity level is below a threshold based on the scale-based rating;

modifying the control based on determining that the maturity level is below the threshold and based on identifying a modification for use in modifying the control;

testing the modified control, the testing comprising:

determining an updated maturity level associated with the modified control, the updated maturity level comprising an updated scale-based rating; and generating a new test result;

determining that the updated maturity level is above the threshold based on the updated scale-based rating;

validating the modified control in response to determining that the updated maturity level is above the threshold; and adapting, for display via a user interface, the control, a portion of the test result, a portion of the new test result, and the modification.

16. The apparatus of claim 15, wherein modifying the control improves the maturity level associated with the control.

17. The apparatus of claim 15, wherein the data samples included in the subset of the plurality of data samples are identified in accordance with the sample data schedule requirement and the sample data size requirement.

18. The apparatus of claim 15, wherein the control is a financial control, wherein the process is a revenue generation process, and wherein the requirement is a government regulation.

* * * * *